Patented Nov. 23, 1937

2,099,758

UNITED STATES PATENT OFFICE 2,099,758

COMPOSITIONS CONTAINING ESTERS OF FORMALS

George W. Seymour, Cumberland, Md., assignor to Celanese Corporation of America, a corporation of Delaware No Drawing. Original application July 12, 1933, Serial No. 680,082. Divided and this application October 17, 1934, Serial No. 748,659. In Canada July 11, 1934

12 Claims. (Cl. 106—40)

This invention relates to the preparation of compositions containing derivatives of cellulose and containing esters of formals as plasticizers or softening agents.

This application is a division of my copending application S. No. 680,082 filed July 12, 1933.

An object of my invention is to prepare compositions, such as plastic or liquid coating compositions, containing derivatives of cellulose wherein an ester of a formal of a polyhydric alcohol is employed as a plasticizer. Other objects of my invention will appear from the following detailed description.

I have found that esters of formals or methylene ethers of polyhydric alcohols are capable of forming solutions with derivatives of cellulose and are excellent plasticizers, softening agents, or camphor substitutes for use in conjunction with derivatives of cellulose to impart softness, pliability and other desirable properties to plastics, films, textiles, and other materials containing derivatives of cellulose.

In accordance with my invention, I prepare compositions containing derivatives of cellulose and esters of formals or methylene ethers of polyhydric alcohols as plasticizer or softening agent.

The esters embraced within this invention may be produced by the reaction of a suitable organic acid or the anhydride of such acid with a formal or methylene ether of a polyhydric alcohol. The organic acid radical of such ester is preferably that of an aromatic or cyclic carboxylic acid, such as benzoic acid, phthalic acid, trimesic acid, naphthoic acid or naphthenic acid.

The formals employed for making the esters preferably contain at least one hydroxy group and may be prepared by the condensation of formaldehyde, formalin, trihydroxymethylene or para-formaldehyde with a suitable polyhydric alcohol such as diethylene glycol, glycerol, triethylene glycol, etc., in the presence of an acidic catalyst, such as ferric chloride or other acid salts, hydrochloric acid, sulfuric acid, phosphoric acid or other strong and weak mineral acid.

Any suitable method may be employed in the preparation of these esters of formals. Thus the formal may be caused to react with the anhydrides or chlorides of the aromatic carboxylic acid. Alternatively the formal may be caused to react with the acid by heating them in the presence of a catalyst or condensing agent such as sulfuric acid.

By way of illustration, but without being limited thereto, the following example of making diethylene glycol formal phthalate is given.

Two (2) molecular proportions of diethylene glycol are condensed with one (1) molecular proportion of para-formaldehyde in the presence of sulfuric acid as catalyst, by heating under reflux for about 18 hours. The water is removed by distillation, and the diethylene glycol formal is distilled under vacuum.

To make the ester, equi-molecular proportions of the diethylene glycol formal and phthalic anhydride are condensed by heating in an open container. The temperature may be varied over a wide range; it is usually sufficient to maintain the temperature at about the boiling point of water. Substantially theoretical yields of diethylene glycol formal phthalate are obtained.

Any suitable derivative of cellulose may be employed in conjunction with the esters of formals, such as cellulose nitrate but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the esters of the formals may be made in any suitable manner and they may be worked up into sheets, rods, tubes, blocks or any other desired shape. Molding powder containing the derivative of cellulose and the ester of the formals in intimate association but containing little or no solvent may be made, and these powders may be molded under heat and pressure to any desired shape. Filaments, yarns and other textile materials may be made from solutions containing the organic derivatives of cellulose and the ester of the formals by extrusion through orifices into an evaporative atmosphere, as in dry spinning, or into a precipitating bath as in wet spinning.

Solutions of the organic derivative of cellulose and the ester of the formal in a volatile solvent may be cast or extruded onto a smooth surface and the volatile solvent permitted to evaporate to form films that may be used for photographic or other purposes. Another application of this invention is in the preparation of laminated glass wherein a plastic sheet containing the derivative of cellulose and the ester of the formal is interposed between sheets of glass. Coating compositions such as lacquers may be formed containing the derivative of cellulose and the ester of the formal dissolved in appropriate solvent mixtures, and resins, either synthetic or natural, compatible with the derivative of cellulose may be added thereto.

The proportion of the ester of the formal to the derivative of cellulose may be varied in accordance with the particular requirements. Generally I have found that in the case of its use with cellulose acetate, the ester of the formal may be employed in amounts of 10% or less to 60% to 100% or more of the weight of the cellulose acetate.

In making the compositions in accordance with my invention, the ester of the formal may be employed as the sole plastifying agent, or it may be used in conjunction with other plastifiers such as triacetin, dibenzyl tartrate, diethyl tartrate, dibutyl tartrate, diethyl phthalate, the phthalate of the mono methyl ether of ethylene glycol, etc.

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

The term "aromatic" as employed hereinafter in the claims is to be construed as including within its scope hydro-aromatic substances, e. g., naphthenic acid.

It is to be understood that the foregoing detailed description is given merely by way of illustration, and that many variations may be made therein without departing from the spirit of my invention.

Having described my invention, what I claim and desire to secure by Letters Patent is:

1. A composition of matter containing a derivative of cellulose and an aromatic carboxylic acid ester of a formal of a dihydric alcohol.

2. A composition of matter containing an organic derivative of cellulose and an aromatic carboxylic acid ester of a formal of a dihydric alcohol.

3. A composition of matter containing cellulose acetate and an isocarboxylic acid ester of a formal of a dihydric alcohol.

4. A composition of matter containing a derivative of cellulose and an aromatic carboxylic acid ester of a formal of a dihydric polyhydric alcohol as plasticizer.

5. A composition of matter containing a derivative of cellulose and the phthalic acid ester of a formal of a dihydric alcohol as plasticizer.

6. A composition of matter containing cellulose acetate and the phthalic acid ester of a formal of a dihydric alcohol as plasticizer.

7. A composition of matter containing a derivative of cellulose and diethylene glycol formal phthalate as plasticizer.

8. A composition of matter containing cellulose acetate and diethylene glycol formal phthalate as plasticizer.

9. A plastic composition containing an organic derivative of cellulose and an aromatic carboxylic acid ester of a formal of a dihydric alcohol in amounts sufficient to impart desired plasticity thereto.

10. A plastic composition containing cellulose acetate and an aromatic carboxylic acid ester of a formal of a dihydric alcohol in amounts sufficient to impart desired plasticity thereto.

11. A plastic composition containing a derivative of cellulose and the phthalic acid ester of a formal of a dihydric alcohol in amounts sufficient to impart desired plasticity thereto.

12. A plastic composition containing cellulose acetate and the phthalic acid ester of a formal of a dihydric alcohol in amounts sufficient to impart desired plasticity thereto.

GEORGE W. SEYMOUR.